Figure 4:
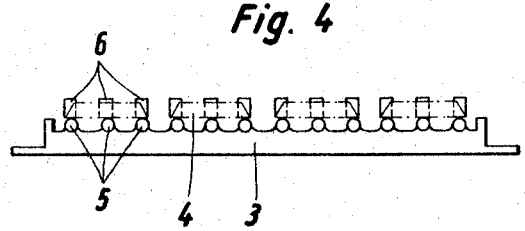

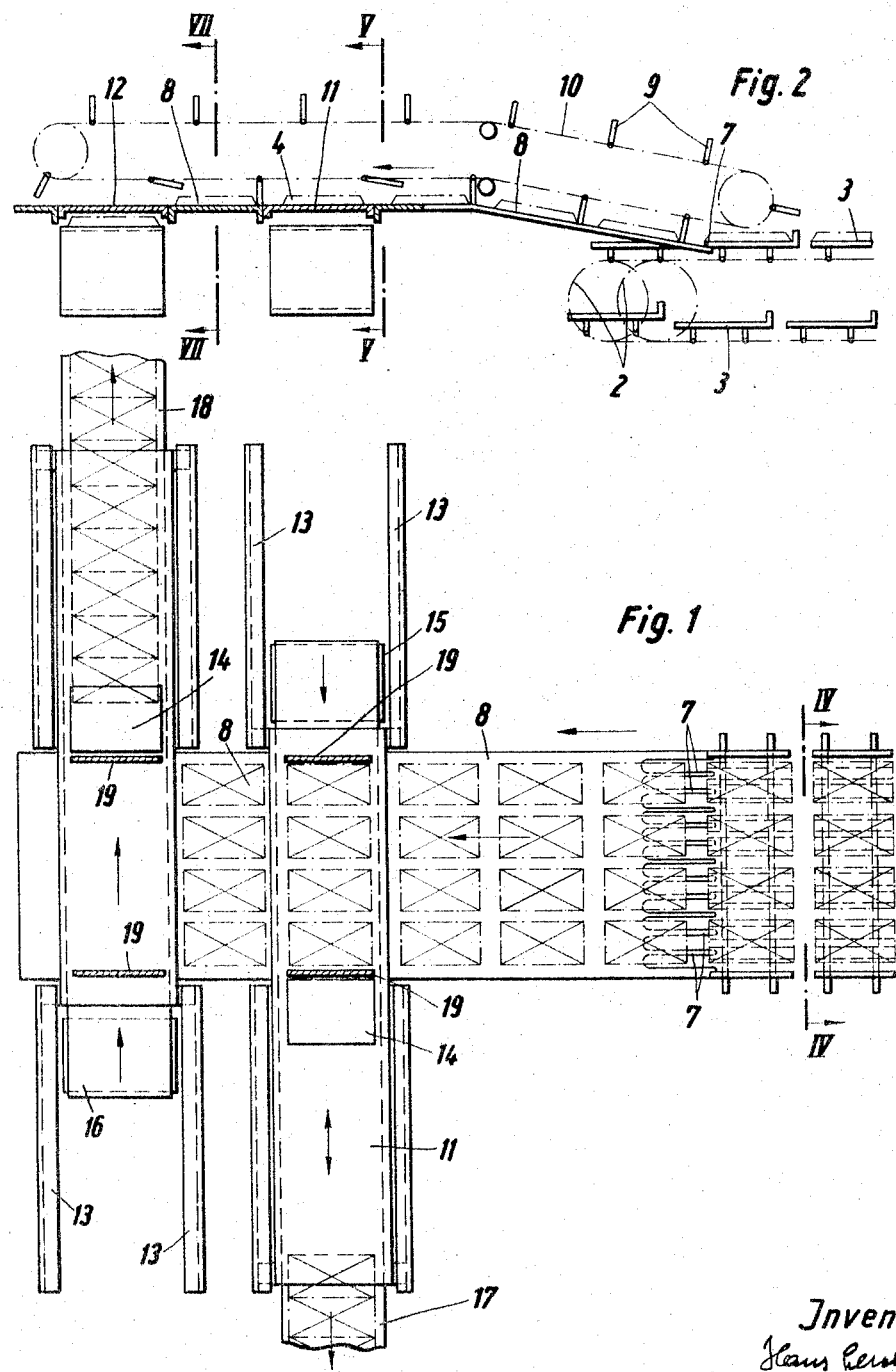

Jan. 10, 1967  H. LESCH  3,297,129
APPARATUS FOR CONVEYING CHOCOLATE BARS OR SLABS
Filed June 1, 1964  8 Sheets-Sheet 3

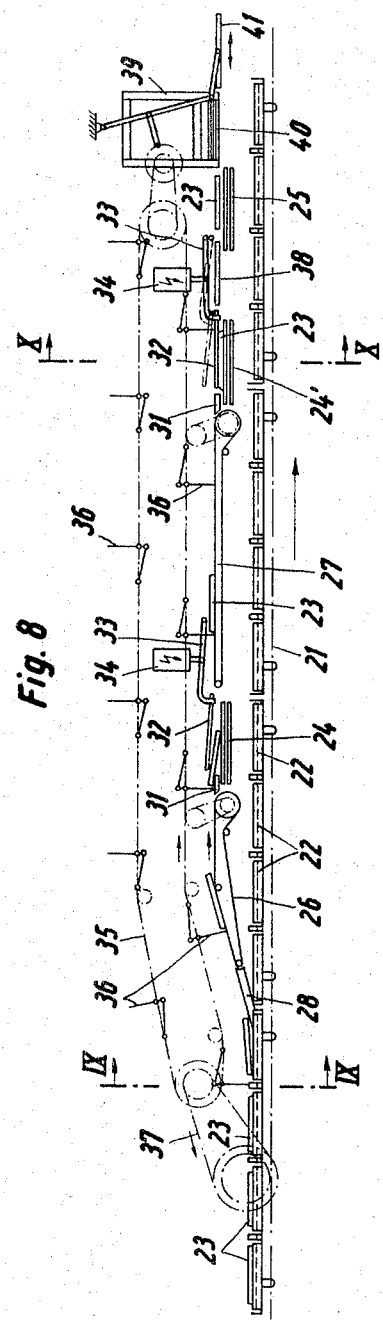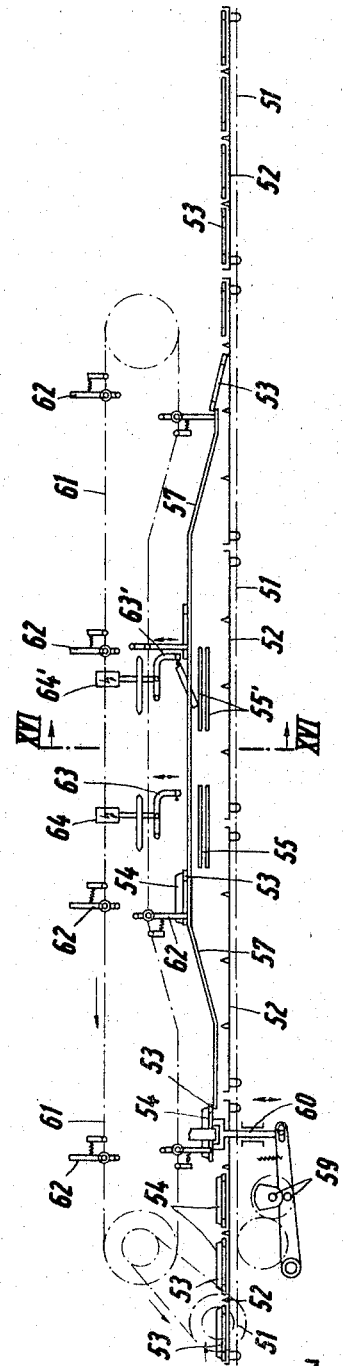

Jan. 10, 1967 H. LESCH 3,297,129
APPARATUS FOR CONVEYING CHOCOLATE BARS OR SLABS
Filed June 1, 1964 8 Sheets-Sheet 6

Inventor:
Hans Lesch

Jan. 10, 1967    H. LESCH    3,297,129
APPARATUS FOR CONVEYING CHOCOLATE BARS OR SLABS
Filed June 1, 1964    8 Sheets-Sheet 7

Inventor:
Hans Lesch

Jan. 10, 1967  H. LESCH  3,297,129
APPARATUS FOR CONVEYING CHOCOLATE BARS OR SLABS
Filed June 1, 1964  8 Sheets-Sheet 8

Inventor:
Hans Lesch
By Ernest Montague
Attorney

United States Patent Office 3,297,129
Patented Jan. 10, 1967

3,297,129
APPARATUS FOR CONVEYING CHOCOLATE BARS OR SLABS
Hans Lesch, Hannover-Kirchrode, Germany, assignor to Otto Hansel G.m.b.H., Hannover, Germany, a corporation of Germany
Filed June 1, 1964, Ser. No. 371,377
Claims priority, application Germany, Feb. 19, 1964, H 51,745
12 Claims. (Cl. 198—32)

The present invention relates to an apparatus for conveying chocolate blocks, bars or slabs continuously from a chocolate moulding machine or from a cooling plant in sequential ranks of bars or the like extending across the direction of feed, to a stacking or further processing station, comprising a main feeder conveyor for carrying consecutive ranks of chocolate bars, a cross conveyor which crosses the feeding direction of the main conveyor and feeds the stacking or further processing station, and apportioning means for transferring ranks of chocolate bars from the main conveyor to the cross conveyor.

As known, it is extremely difficult to distribute the large number of chocolate bars and slabs, which issue from a cooling plant or a moulding machine at a rate of something like 400 bars per minute, between several packaging machines without creating a bottleneck. The difficulties become even greater, if different kinds of chocolate bars, say 4 oz. bars and 2 oz. bars, issue from the chocolate bar machine and the bars fed to each individual packaging machine must all be of the same kind.

It is one object of the present invention to provide an apparatus for conveying chocolate bars or slabs which comprises a feedway in continuation of a main feeder conveyor, the feedway extending across the cross conveyor or cross conveyors and including bridging members actuable by change-over means for optionally causing or preventing transfer of the chocolate bars from the feedway to the cross conveyor or conveyors. Interposed between the main conveyor and the cross conveyor are transfer means which operate in synchronism with the main conveyor and remove the ranks of chocolate bars from the main conveyor, in order to transfer the same to the cross conveyor, apportioning means cooperating with the transfer means for depositing apportioned ranks of chocolate bars on the cross conveyor in such a way, that the bars which form ranks on the transfer means thereafter travel in single file on the cross conveyor.

Several cross conveyors may be served by the same main conveyor, the associated feedway or transfer means extending across all the cross conveyors, whereas apportioning means for the ranks of chocolate bars are provided above each cross conveyor.

It is another object of the present invention to provide an apparatus for conveying chocolate bars or slabs, wherein the transfer means may consist of a table, slideway or the like, adjoining the end of the main conveyor and extending across the associated cross conveyors, and of entraining means sweeping along the table in the direction of the main conveyor, the entraining means being for instance attached to a conveyor chain and engaging the ranks of chocolate bars which arrive on the main conveyor and conducting them along the table or slideway.

A convenient alternative comprises a feedway which at least at the entry end merges into the feed path of the main conveyor and consists of endless travelling conveying members, such as chains, a belt or the like forming a feedway to the cross conveyors or extending between neighbouring cross conveyors, there being provided at the entry and a deflecting means for lifting the ranks of chocolate bars from the main conveyor and, above each cross conveyor, raisable bridges adapted, when required, to conduct the stream of chocolate bars across the cross conveyor.

It is still another object of the present invention to provide an apparatus for conveying chocolate bars or slabs, which includes a plurality of loose pallets on the main conveyor each carrying a number of serially placed trays and each tray carrying a rank of chocolate bars. The transferring means comprise a feedway which bridges over all the cross conveyors, and which descends on either side of the cross conveyors to a level closely above the feed plane of the main conveyor, lifting means for lifting the ranks of chocolate bars from the main conveyor and for lowering the empty trays on to the main conveyor being provided at the entry and discharging end, respectively, of the feedway. The entrainment of the trays carrying the ranks of chocolate bars which have been lifted to the level of the feedway is then effected, in a manner analogous to that already described, by a conveyor means fitted with entraining elements which operate above the feedway.

Figure 3:
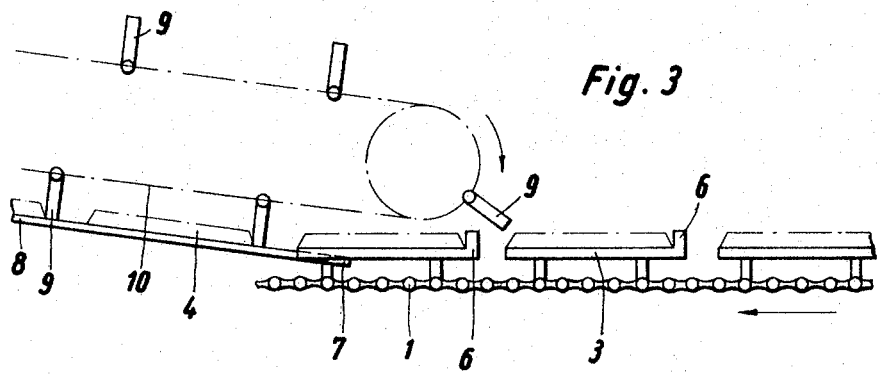
Figure 5:
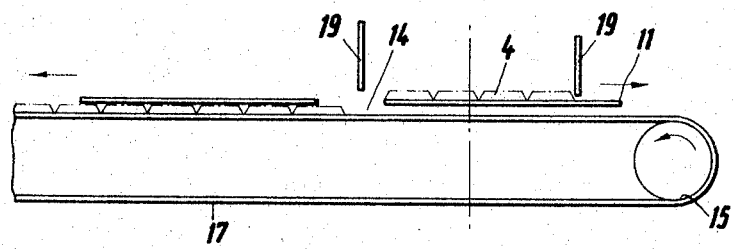
Figure 6:
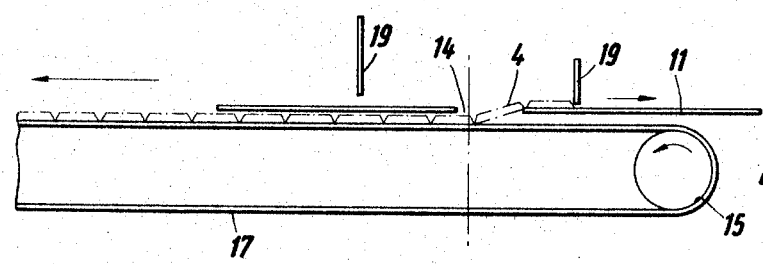
Figure 7:
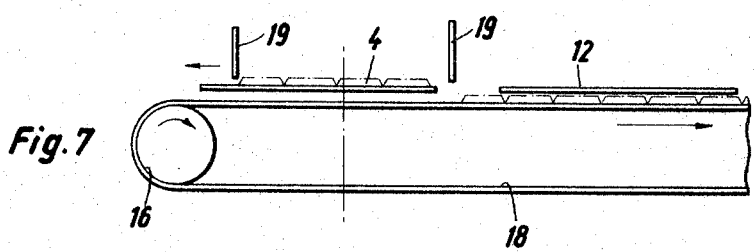
Figure 9:
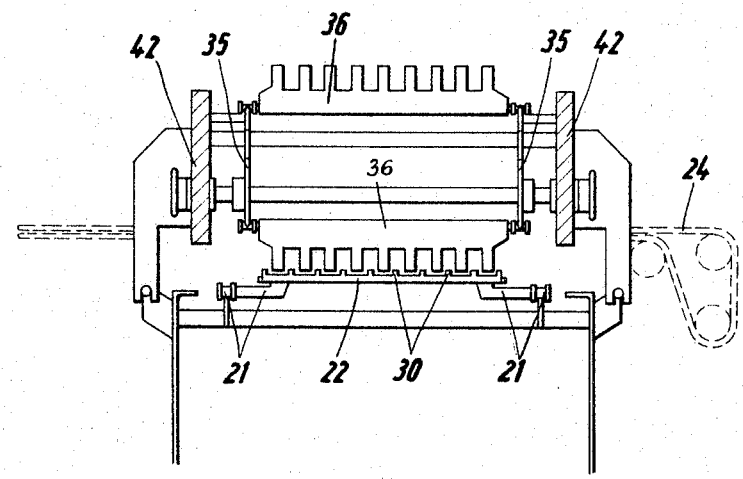
Figure 11:
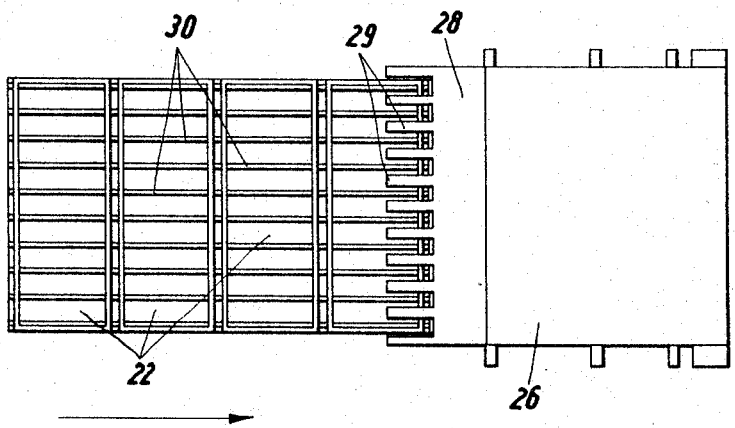
Figure 10:
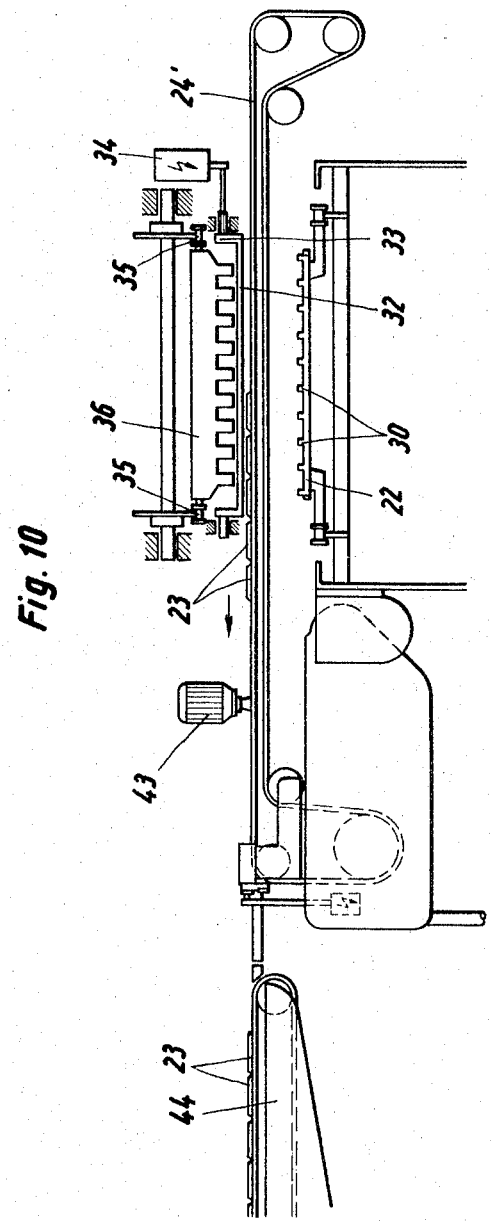
Figure 13:
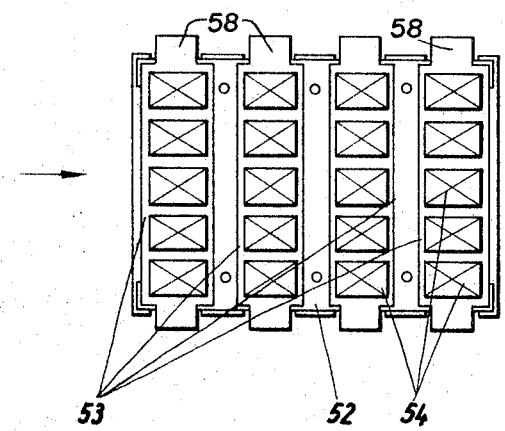
Figure 14:
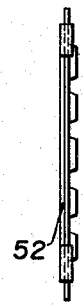
Figure 15:
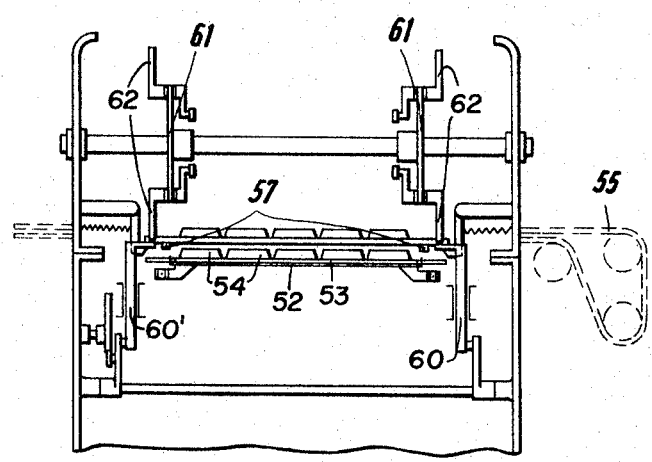
Figure 16:
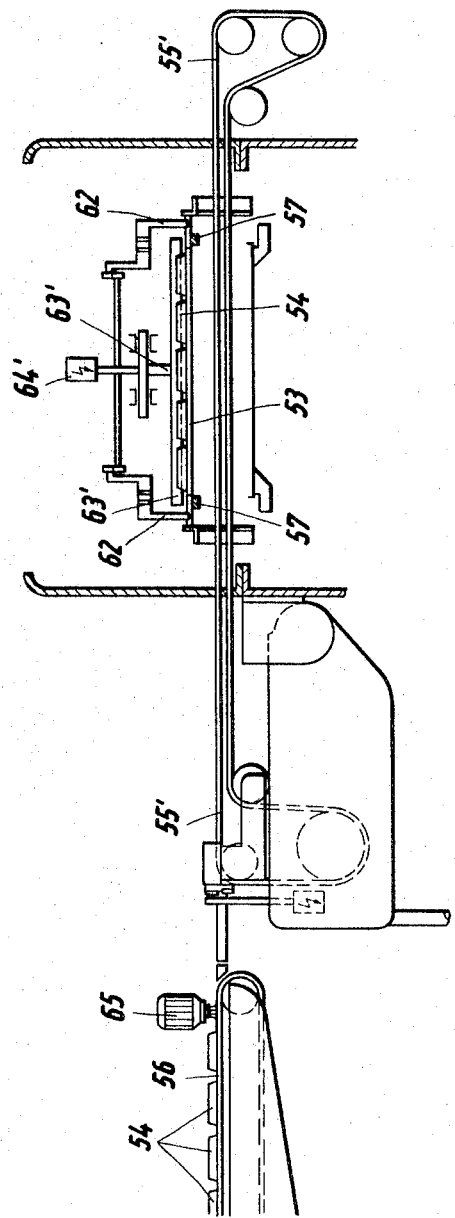

With these and other objects in view, which will become apparent in the following detailed description, the present invention will be clearly understood in connection with the accompanying drawings, in which:

FIGURE 1 is a plan view of the essential part of a conveyor installation according to the present invention;
FIG. 2 is a side elevation of the installation, according to FIG. 1;
FIG. 3 is a portion of FIG. 2 shown on a larger scale;
FIG. 4 is a section along the lines 4—4 of FIG. 1, shown on a larger scale;
FIGS. 5 and 6 are sections along the lines 5—5 of FIG. 2, on a larger scale, showing the working parts in different operational positions;
FIG. 7 is a similar section along the lines 7—7 of FIG. 2;
FIG. 8 is a schematic elevation of another embodiment of the apparatus, particularly of a part of the main conveyor and of the feedway and cross conveyors above the same;
FIG. 9 is a section along the lines 9—9 of FIG. 8;
FIG. 10 is a section along the lines 10—10 of FIG. 8;
FIG. 11 is a plan view of the entry side of the feedway;
FIG. 12 is a side elevation of another embodiment of the installation, individual elements being schematically represented;
FIGS. 13 and 14 are a plan view and side elevation, respectively, of one of the carrier elements constituting the main conveyor and of the trays which carry the ranks of chocolate bars;
FIG. 15 is an end view of FIG. 12; and
FIG. 16 is a section along the lines 16—16 of FIG. 12.

Referring now to the drawings, and in particular to FIGS. 1 to 7 twin chains 1 driven by chain wheels 2 carry grates 3 which convey chocolate bars 4 in ranks in the arrowed direction from a chocolate moulding machine or from cooling plant. The width of this conveyor is quite arbitrary. Generally speaking, several bars 4 of chocolate may be carried on the conveyor in each consecutive rank, a rank comprising say four to eight bars. In the embodiment illustrated in FIG. 1 four bars 4 are conveyed side in each rank and it is immaterial whether consecutive ranks contain bars of the same or different size. For example, some of the ranks might be composed of say 4 oz. bars and others of 2 oz. bars. The grates 3 are composed of grate bars 5 extending in parallel in the direction of travel, the rear ends of the grate bars being provided with an upright edge 6 for aligning the chocolate bars 4 on the grates 3. The grate bars 5 are relatively spaced and, therefore, permit the chocolate bars 4 to be pushed on to stationary upwardly sloping track bars 7 of a slideway 8, the track bars 7 descending into the gaps between the bars 5 of the moving grates 3 (FIG. 1).

The slideway 8 forms a smooth table surface above which a conveyor means fitted with pushers 9 revolves in the arrowed direction as indicated in FIG. 2. Traversible slides 11 and 12 which will be hereunder described, and which are movable in guide rails 13 by drive means, not specially shown, form part of the table surface of the slideway 8.

The traversible slides 11 and 12 are each formed with a window-like opening 14 corresponding in size to the size of a chocolate bar. Closely below each of the slides 11 and 12, respectively, a conveyor belt 17 and 18 is arranged to travel on rollers 15 and 16, respectively. As indicated in FIG. 1 these two cross conveyors travel in opposite directions and are therefore adapted to carry away chocolate bars in different directions. Fixed above the slides 11 and 12 are retaining ledges 19, which are adapted to sweep the chocolate bars 4 off the slide at the appropriate instant.

The described arrangement functions as follows:

The chocolate bars 4 arranged in ranks of between four and eight bars, one rank on each grate 3, are conveyed in the arrowed direction from a refrigerator or chocolate bar machine. They are aligned by the upright rear edge portions 6 of the grate bars. At the discharging end of the conveyor chain 1 prongs projecting from the end of slideway 8 extend obliquely downwards between the supporting bars 5 of the grates 3. At the same time the pusher members 9 of the conveyor means 10 engages the rear end of the chocolate bars which are therefore forwarded along the table 8 in relatively spaced ranks in the manner illustrated in FIG. 2. The leading rank of the chocolate bars finally slides on to the cross slide 11 which receives them in the position shown in FIG. 5. At the same instant a stop means (not shown) deflectably raises the pusher 9 of the conveyor means 10, which had been forwarding this particular rank, in the manner shown in FIG. 2. The rank of the chocolate bars 4, therefore, comes to a halt on slide 11, whereas the raised pusher 9 continues to travel across the bars without further touching the latter. At this instant the slide 11 is traversed from its position in FIG. 5 into the position shown in FIG. 6, so that the chocolate bars 4 consecutively fall through the window 14 in the slide 11 onto the conveyor belt 17 underneath. The latter now conveys the chocolate bars in serial succession in a single file to an associated packaging station.

The cross movement of the slide 11 is so rapid that the windowless end of the slide 11 can close the gap in table 8 in time to permit the next rank of chocolate bars 4 to be pushed across the slide 11 and to be conveyed on to the next slide 12. In this instance, the associated pusher 9 of the conveyor 10 remains in operative position. Controlled by suitable stop means, it will not be deflected into inoperative position until the rank of the chocolate bars which it propels is on the slide 12. When this is the case, this latter slide 12 moves in analogous manner to that already described and causes the chocolate bars 4 to be deposited on the conveyor belt 18 which travels in a direction opposite to that of the first mentioned belt 11.

As soon as this rank of chocolate bars 4 has passed across the first slide 11 the latter can return into its former position. The same applies to slide 12. In either case the fixed ledges 19 which end closely above the surface of the slide ensure that the chocolate bars 4 will be retained when the slide is traversed and that they will drop through the window 14.

It will be readily understood that the motions of the several conveyor means and slides must be carefully synchronised. More cross slides can be provided, if it is desired to divide the stream of bars from the refrigerator into further component streams for feeding additional packaging stations.

Referring now again to the drawings, and in particular to FIGS. 8 to 11, a main feeder conveyor 21 is provided in the form of chains or the like. The main feeder conveyor 21 travels in the arrowed direction and is fitted with plates 22 for carrying chocolate bars 23 in consecutive ranks. Located above the main feeder conveyor 21 are cross conveyor belts 24 and 24'. These travel across the direction of motion of the main conveyor 21 and they are incorporated in the feedway provided according to the present invention. Finally, an additional cross conveyor 25 is located at the end of the feedway for the reception of chocolate bars 23 which have not been transferred to one of the cross conveyors 24 or 24' and for carrying them to a central collecting station (not shown).

The feedway is located closely above the main conveyor 21 and comprises an entry feeder belt 26 and a further belt 27 operating between the two cross conveyor belts 24 and 24'.

Preceding the entry feeder belt 26 is a raisable and lowerable pickup apron 28 with a leading edge constructed in the manner of a comb consisting of prongs 29 (FIG. 11). When lowered, these prongs 29 project into the gaps between ribs 30 on the conveyor plates 22 of the main conveyor 21 so that the chocolate bars 23 can ride up the pickup apron 28 on to the entry feeder belt 26. At the end of this belt 26 as well as at the end of belt 27 is a narrow intermediate table 31, which partly projects beyond the following cross conveyor belt 24 and 24', respectively, besides cooperating with a bridge 32 which is alignable therewith. The bridge 32 is mounted on a deflectable arm 33 and can be hingeably raised by actuating means 34 in such a way, that in the lowered position of the bridge 32 the chocolate bars can travel across the cross conveyor 24 or 24' which is situated at a slightly lower level, whereas in the raised position of the bridge 32 the chocolate bars 23 will be deposited in consecutive ranks forming a file on the cross conveyor beneath.

The feed motion of the chocolate bars 23 along the transfering feedway is assisted by pusher elements 36 attached to a chain 35. The pusher elements 36 each engage the rear edge of each rank and entrain the chocolate bars 23 in feeding direction. It will be readily understood that the chain 35 and its pusher elements 36 travel codirectionally with and at the same speed as the conveyor belts 26 and 27, which form part of the feedway. Chain 35 may be driven through a transmission 37 from the main conveyor drive.

The feedway terminates at the collecting conveyor belt 25 upon which all those chocolate bars 23 which have not been deposited on one of the cross conveyors 24 and 24' are transferred across a stationary table 38.

Located directly alongside the collecting conveyor belt 25 is a stack 39 of pallets 40 which are transferable one by one by a reciprocating plunger 41 on to conveyor belt 25 at the same time as a rank of chocolate bars 23 is delivered across table 38 from the opposite side. All those chocolate bars 23 which have not been transferred to the cross conveyors 24 and 24' can thus be delivered on to pallets 40, which can be tidily stacked at a suitable collecting station (not shown) for reintroduction into the production line as and when they are required.

Referring now to FIGS. 9 and 10, it will be seen that the ends of the pusher elements 36 are toothed like a comb to permit them correctly to engage the rear ends of the chocolate bars 23 by projecting into the spaces between the rib members 30 which support the chocolate bars on the conveyor plates 22. The conveyor chains 35 are contained between stationary side walls 42 of the machine frame above the main conveyor 21.

On one side of the feedway above each cross conveyor 24 and 24', respectively, control means 43 are provided which are operationally connected with the actuating means 34 in such a way, that whenever no chocolate bars 23 occupy the cross conveyor 24 or 24', the bridge 32 will be raised by actuator 34 for depositing the next rank of chocolate bars arriving on the belt 26 or 27, respectively, on the cross conveyor 26 or 27 below. Each cross conveyor feeds the receiving conveyor 44 of a further processing station.

Referring now to FIGS. 12 to 16, the chocolate bars arrive on a main feeder conveyor 51 which travels in the arrowed direction. To this end the main feeder conveyor 51 which normally comprises several chains, is fitted with carrier elements 52 (FIG. 13) of which each supports a plurality of trays 53, each tray carrying a rank of chocolate bars 54 in side-by-side alignment. Above the main feeder conveyor 51 are the cross conveyors 55 and 55' which operate to convey the chocolate bars 54 individually in a continuous file to the receiving conveyor 56 of a chocolate bar packaging machine or a stacking station.

In the illustrated embodiment two cross conveyors 55 and 55' are provided which cross over above the main feeder conveyor 51. The cross-over points between these two conveyor belts 55 and 55' and the main feeder conveyor 51 are bridged by a slideway formed by two parallel rails 57. The trays 53 which carry the ranks of chocolate bars are provided with lateral extensions 58, projections or the like, which are adapted to slide on these rails 57.

From FIG. 12 it will be understood that the slideway 57 gradually descends towards the main feeder conveyor 51 on either side of the cross conveyors 55 and 55'. At the entry end of the slideway 57 (left hand side in FIG. 12) there is a lifting device comprising two lifting rods 60 actuated by a cam mechanism 59. The lifting rods engage the lateral extensions or projections 58 of the trays 53, whereas the main feeder conveyor 51 and the carrier element 52 can pass between the lifting rods 60. The actuating mechanism 59 raises and lowers the lifting rods 60 in synchronism with the required working cycle, raising the trays 53 singly in succession to a level closely above the ends of the rails of the slideway 57.

Revolving endless chains 61 above the slideway 57 carry pusher members 62. The only purpose of these pusher members is, as shown in FIGS. 12 and 15, to engage the rear edge of the tray 53 or the rear edge of its lateral extensions 58 and to push the tray 53 off the lifting rods 60 onto and along the slideway 57.

Located above each of the cross conveyors 55 or 55' are activatable and inactivable dislodging elements 63 and 63'. These are activated and inactivated by electrical control means 64 and 64' as and when required. In the course of the rotation of the chain 61 and pusher members 62, the trays 53 are pushed along the slideway 57 and reach a position beneath the dislodging elements 63. If this dislodging element 63 or 63' happens to be activated, the rank 54 of chocolate bars resting on a tray 53 is swept off the tray and, as shown on the right hand side in FIG. 12, they are thus transferred on to the cross conveyor belt 55' below. Since the chain 61 with the pusher members 62 continues to rotate, the empty trays 53 will eventually be redeposited, in the manner shown in FIG. 12, on the carrier elements 52 of the main feeder conveyor 51. These trays 53 can then be reloaded with chocolate bars 54.

Provided above the receiving belt 56 of the packaging machine is a detector or an electric photocell 65 which monitors the rate at which the chocolate bars are fed into the packaging machine. If the packaging machine requires a higher rate of feed, that is to say if the intervals between consecutive chocolate bars are excessive, then detector, namely the electric photocell 65 adjusts the actuating mechanism of the dislodging elements 63 and/or 63' accordingly, causing more ranks of chocolate bars to be swept on to the associated cross conveyor belt 55. The stream of chocolate bars is thus adjusted according to the handling capacity of the conveyor installation and the handling capacity of the packaging machine. Hence, a main feeder conveyor 51 may be associated with packaging machines for chocolate bars which operate at different rates, the correct rate of feeding chocolate bars onto the associated cross conveyor being controlled by the associated detector 65.

While I have disclosed several embodiments of the present invention, it is to be understood that these embodiments are given by example only and not in a limiting sense, the scope of the present invention being determined by the objects and the claims.

What I claim is:

1. An apparatus for conveying chocolate bars, blocks or slabs from a chocolate molding machine or from a cooling plant in sequential ranks of bars or the like extending across the direction of feed, to a stacking or further processing station, comprising
   a main feeder conveyor for carrying consecutive ranks of chocolate bars,
   at least one cross conveyor crossing the feeding direction of said main feeder conveyor,
   a slideway feeding said ranks of chocolate bars from said main feeder conveyor to said cross conveyor and positioned over the end of said main feeder conveyor,
   means moving in the same direction as that of said main feeder conveyor and including an endless pusher element in the longitudinal direction of and above and overlapping said main feeder conveyor and said slideway, and said pusher elements being adapted to engage and to align the rear edges of said chocolate bars disposed in a single row,
   said cross conveyor being positioned transverse and below said slideway,
   said slideway having a slidable member positioned above said cross conveyor, and
   means for moving said slidable member.

2. The apparatus, as set forth in claim 1, wherein said slideway is disposed adjacent said main feeder conveyor and rises towards said cross conveyor, and said pusher element slides along the surface of said slideway towards said cross conveyors.

3. The apparatus, as set forth in claim 2, wherein said slideway has a recess coverable by said slidable member and the latter moving in the direction of said cross conveyors.

4. The apparatus, as set forth in claim 3, wherein said slidable member is equipped with a window-like opening complementary to the outer shape of said chocolate bar, and
   fixed ledges disposed above said slidable member on both sides of a row of chocolate bars in order to strip off the latter from said slidable member.

5. The apparatus, as set forth in claim 4, wherein said slidable member has a receiving face for a complete row of the chocolate bars on both sides of its window-like opening, said face corresponding with the width of said slideway and the length of one row of the chocolate bars, respectively.

6. The apparatus, as set forth in claim 1, wherein said endless pusher element comprises a conveyor chain supporting pushers, and
   control means disposed above each of said cross conveyors and controlling the position of said pushers.

7. The apparatus, as set forth in claim 6, which includes
   a joint driving means for the timely coordination of the movements of said conveyors and of the control means for said pushers.

8. The apparatus, as set forth in claim 1, wherein said main feeder conveyor comprises successive supporting grates for each row of chocolate bars,
   each of said grates includes a plurality of grate bars disposed in the direction of feeding, and
   said slideway includes track bars extending into grates defined by each pair of adjacent grate bars.

9. The apparatus, as set forth in claim 8, wherein said grates have an upright edge at the rear end, adapted to form a cross-ledge for aligning said chocolate bars to a straight cross row.

10. The apparatus, as set forth in claim 1, wherein said cross-conveyors are disposed with their working plane above the working plane of said main feeder conveyor.

11. The apparatus, as set forth in claim 1, which includes
an additional cross conveyor disposed along said main feeder conveyor and behind said first mentioned cross conveyor, and
said additional cross-conveyor receiving chocolate bars not received by said first-mentioned cross-conveyor.

12. The apparatus, as set forth in claim 1, which includes
a feeder for pallets disposed at the end of the feedway, and
said feeder transferring one of said pallets into receiving position upon arrival of one row of said chocolate bars.

References Cited by the Examiner
UNITED STATES PATENTS 2,776,741   1/1957   Carrier _____ 198—205 X
3,181,685   5/1965   Brunner et al.

FOREIGN PATENTS 1,341,242   10/1963   France.

EVON C. BLUNK, *Primary Examiner.*

SAMUEL F. COLEMAN, *Examiner.*

R. M. WALKER, R. E. AEGERTER,
*Assistant Examiners.*